United States Patent [19]

Pluyter et al.

[11] Patent Number: 4,966,803

[45] Date of Patent: Oct. 30, 1990

[54] POLYMER FILMS PARTIALLY PROVIDED WITH STIFFENED SEGMENTS, PROCESS FOR THE PRODUCTION THEREOF, AND THE USE THEREOF

[75] Inventors: Pieter B. Pluyter, Sittard; Hendrikus J. J. Rutten, Maastricht, both of Netherlands

[73] Assignee: Stamicarbon, B.V., Geleen, Netherlands

[21] Appl. No.: 223,594

[22] Filed: Jul. 25, 1988

[30] Foreign Application Priority Data

Jul. 23, 1987 [DE] Fed. Rep. of Germany ....... 3724438

[51] Int. Cl.$^5$ .............................................. B32B 9/00
[52] U.S. Cl. ..................... 428/192; 428/412; 428/419; 428/421; 428/422; 428/473.5; 428/480; 428/483; 428/522; 428/910; 156/155; 156/242; 156/246; 264/204; 264/290.2; 264/289.3; 264/331.15
[58] Field of Search ............... 428/412, 419, 421, 422, 428/473.5, 480, 483, 522, 192, 910; 156/155, 242, 246; 264/204, 290.2, 289.3, 331.15

[56] References Cited

U.S. PATENT DOCUMENTS

| | | | |
|---|---|---|---|
| 3,562,383 | 2/1971 | Ayres | 428/192 |
| 3,634,182 | 1/1972 | Biglin et al. | 428/192 |
| 4,090,008 | 5/1978 | Haley | 428/192 |
| 4,551,296 | 11/1985 | Kavesh et al. | 264/204 |
| 4,600,633 | 7/1986 | Kono et al. | 428/192 |
| 4,663,101 | 5/1987 | Kavesh et al. | 264/204 |
| 4,664,859 | 5/1987 | Knoop | 264/204 |
| 4,726,977 | 2/1988 | Goldstein et al. | 428/192 |

FOREIGN PATENT DOCUMENTS

| | | |
|---|---|---|
| 1061821 | 3/1986 | Japan . |
| 1066624 | 4/1986 | Japan . |
| 2164897 | 4/1986 | United Kingdom . |
| 2164898 | 4/1986 | United Kingdom . |

Primary Examiner—Patrick Ryan
Attorney, Agent, or Firm—Cushman, Darby & Cushman

[57] ABSTRACT

The invention relates to films of polymers of high molecular weight, which have been obtained by casting polymers dissolved or swollen in solvents and partially contain stiffened segments, which films serve either for decorative, handling or fixing purposes or allow, especially when formed on the film edges, a particularly ultrahigh stretching of the films without excessive formation of lips.

14 Claims, 1 Drawing Sheet

POLYMER FILMS PARTIALLY PROVIDED WITH STIFFENED SEGMENTS, PROCESS FOR THE PRODUCTION THEREOF, AND THE USE THEREOF

FIELD OF THE INVENTION

The invention relates to films of polymers of high molecular weight, which have been obtained by casting polymers dissolved or swollen in solvents and which partially contain stiffened segments.

BACKGROUND OF THE INVENTION

Thin films can be produced from polymers of high molecular weights, in particular ultrahigh molecular weights, by the dissolution process or swelling process, in such a way that the polymers are dissolved or swollen in a solvent, and the solution or swollen material is shaped to give a film which is then cooled to a temperature below the gelling temperature of the polymer, whereupon the film is stretched simultaneously or sequentially in the longitudinal and transverse directions after at least partial removal of the solvent.

Especially when ultrahigh stretching ratios (stretching ratios of more than five in each direction in the case of simultaneous stretching) are maintained, the problem arises that the gelled films obtained after cooling are more extensively stretched in the areas, at which they are gripped by the clamps of the stretching device, than in the areas not gripped by the clamps, which entails, with increasing stretching ratios, the formation of increasingly thinning lips which can tear when higher stretching ratios are reached. Furthermore, the film segments adjoining these lips have a greater anisotropic orientation than the segments which adjoin the lateral film segments not gripped by the clamps. Accordingly, the properties are anisotropic (unequal) at the film edges, so that the edge segments of films, especially those stretched at ultrahigh stretching ratios, must be cut off to a considerable width, which causes waste quantities of 20 to 50%.

Moreover, there is a demand for the production of stretched thin films which, for decorative or handling reasons or for fixing purposes, must have stiffened segments. This demand remains essentially unfullfilled.

SUMMARY OF THE INVENTION

The invention meets the aforesaid demands by providing films from polymers of high molecular weight, which have been obtained by casting polymers dissolved or swollen in solvents and which, on the one hand, can be stretched without the above-mentioned disadvantages for the production of thin films and, on the other hand, have segments suitable for decorative, handling or fixing purposes. Such films avoid the 20–50% waste associated with prior films.

DESCRIPTION OF THE INVENTION

Figure 1:
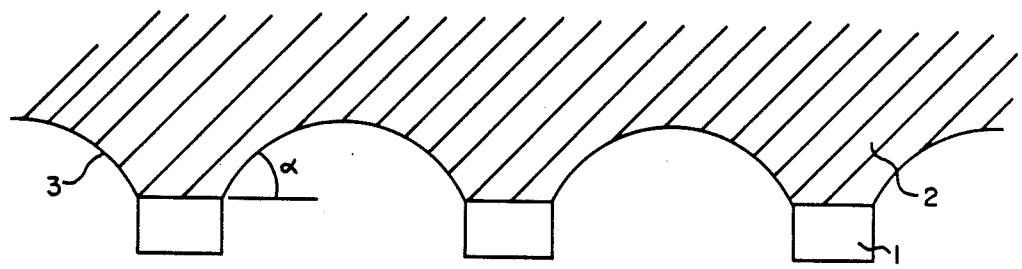
FIG. 1 shows the appearance of an edge part which has been obtained by stretching without stiffened segments on the edges.

The films according to the invention are made from polymers of high molecular weight and have been obtained by casting polymers dissolved or swollen in solvents. Characteristically these novel films contain stiffened segments.

Preferably, the stiffened segments are located at the edges of the films. With this embodiment, it has been found surprisingly that, when the films are stretched to obtain thin films, lips no longer appear, or only to a slight extent. These stiffened segments permit a more uniform distribution of the tension by the pulling clamps engaging at the edges for stretching. Therefore, when the films according to the invention having stiffenings at the edge segments are used for the production of thin films by stretching at especially ultrahigh stretching ratios, there is, on the one hand, no longer a risk of tearing in the areas gripped by the pulling clamps and, on the other hand, the high waste, caused by cutting-off the edge segments of the finished films which have been stretched in the known manner, is considerably reduced or substantially eliminated. A further advantage is that, when a certain stretching ratio of the clamps is maintained in the case of the polymer films according to the invention which are stiffened particularly at the edges, a higher degree of stretching of the latter as compared with nonstiffened films is possible, so that better utilization of the stretching device and hence more economical working are possible.

In addition to the edge segments, the films which are to be stretched can also have stiffenings in other areas, which stiffenings serve for decorative purposes, facilitate the handling of the finished stretched thin films or serve as stiffened segments for fixing the films by screwing, for fitting eyelets and the like.

The films according to the invention can be in a form prestretched in the longitudinal and/or transverse direction, before they are provided with the stiffened segments. Accordingly, the films can, after cooling to a temperature below the gelling temperature, be prestretched to a certain extent in any desired manner in the longitudinal and/or transverse direction, since the problem of lip formation at the edges does not arise in this case. These prestretched films can then be provided with stiffened segments at the edges and/or in other areas, depending on the intended use.

The films according to the invention can be produced by dissolving or swelling a polymer of high molecular weight in a solvent, shaping the polymer solution or the swollen polymer to give a film, cooling the resulting film to a temperature below the gelling temperature, at least partially removing the solvent and, if appropriate, prestretching in the longitudinal and/or transverse direction. In this process the film, in the segments which are to be stiffened, is heated in the solvent-free state to a temperature which is between 10° C. below the crystalline melting point and the decomposition temperature, and, if the film still contains solvent, it is heated to a temperature which is above the dissolution temperature and below the decomposition temperature.

Advantageously, the heating is carried out for a period which is sufficient for re-entangling of the polymer molecules, in accordance with the equation:

$$\frac{\text{degree of uniaxial stretching of the entangled form}}{\text{degree of uniaxial stretching of the disentangled form}} \leq 0.8.$$

Another variant for making the films according to the invention comprises producing the stiffened segments by lamination with a polymer film on one side or on both sides, especially with a film of a polyolefin of low density, such as low-density polyethylene, such as LDPE and LLDPE.

The films according to the invention are used especially for the production of thin films by uniaxial and/or biaxial stretching, in particular ultrahigh stretching.

The polymers of high molecular weight, used for producing the films according to the invention, are, for example, polyolefins such as polyethylene and polypropylene, polysulfones, polyimides, polycarbonates and halogen-containing polymers such as polytetrafluoroethylene, polyvinylidene fluoride, polyvinylalcohols, polyacrylonitrils, and the like. All polymers which can be dissolved or swollen by appropriate solvents and can be shaped in the form of solutions or swollen polymers to give a film, for example by means of a shaping die can be used. The polymers are dissolved in an expedient manner in an extruder, especially in a twin-screw extruder, at an elevated temperature, it being possible for static mixers to be provided downstream of the extruders in order to accelerate the dissolution under the action of shear.

Especially, polyolefins of high molecular weights, that is to say molecular weights of more than $1 \times 10^4$ g/mol, in particular of ultrahigh molecular weights from $4 \times 10^5$ to $6 \times 10^6$ g/mol and higher (weight average molecular weight), can be used according to the invention. Especially, linear polypropylenes and in a very particularly preferred manner linear polyethylenes are used here. The use of copolymers is also possible, and, for example, linear polyethylenes can be used which contain minor quantities, preferably at most 5 mol%, of one or more other alkenes copolymerizable therewith, such as propylene, butylene, pentene, hexene 4-methylpentene, octene and the like. Preferably, the polyethylene contains 1 to 10, especially 2 to 6, methyl or ethyl groups per 1000 carbon atoms. The polyolefins can also contain minor quantities of one or more other polymers, especially alkene-1 polymers.

The polymers used can contain known additives such as fillers, stabilizers against degradation by ultraviolet radiation or ozone, flame-proofing agents, crystallizing agents such as calcium stearate, and the like, or all these additives can be added to the solution or swollen material.

The invention is explained in more detail below with reference to polyethylenes of ultrahigh molecular weight as particularly preferred polymers for the production of the films according to the invention.

The solvents used for these polyethylenes and also for other polyolefins of ultrahigh molecular weight and copolymers thereof are the halogenated and non-halogenated hydrocarbons known for this purpose, in particular aliphatic, cycloaliphatic and aromatic hydrocarbons having boiling points of at least 100° C., such as paraffins, toluene, xylenes, tetralin, decalin, $C_9$-$C_{12}$ alkanes or petroleum fractions. It is also possible to use solvents which are solid at room temperature but are liquid at the dissolution temperature, such as paraffin waxes. The polyethylene is advantageously dissolved in these hydrocarbons in quantities of between 1 and 80% by weight, especially 10 and 50% by weight. Preferably, the dissolution takes place at a temperature between 100° and 220° C., decalin being used as a particularly preferred solvent. The dissolution temperature depends of course on the particular polyolefin used, on the solvent used, on the quantity to be dissolved and on the equipment used for dissolution. In an advantageous manner, the dissolution takes place in an extruder, as described above, the residence time in the extruder being advantageously between 1 and 25 minutes, especially between 3 and 15 minutes. The polyolefin goes into solution, assisted by the kneading action in the extruder and in the static mixers which may be provided downstream. The solution is then extruded in an advantageous manner through a shaping die which preferably has a width between 60 and 700 mm and a height between 100 μm and 10 mm, a tape is formed which is rapidly cooled to a temperature below the dissolution temperature of the polyolefin, a gel then being formed. The cooling can be carried out by introducing the film into a cooling bath, by blowing a cooling gas onto the film or by using cooling rolls. If a cooling bath is used, the coolant used is preferably water, but the solvent which has been employed for the dissolution or swelling of the polyethylene can also be used as the coolant. It is also possible to use an agent which extracts the solvent. Preferably, the temperature of the cooling bath is 15° to 20° C.

The solvent is at least partially removed, for example by evaporation, by squeezing or by extraction.

The gelled film obtained can then be prestretched to a certain slight extent, in the longitudinal and/or transverse direction as appropriate, before the stiffening treatment according to the invention is carried out. For example, the degree of prestretching in one or both directions can be between 1.1 and 3.

According to a particularly preferred embodiment, the stiffening treatment is carried out in such a way that the film obtained by dissolution in a solvent or by swelling in a solvent is heated, after the cooling described and at least partial removal of the solvent, in the segments to be stiffened to a temperature which, in the case of solvent-free films is between 10° C. below the crystalline melting point and the decomposition temperature and, if the film still contains solvent, is at a temperature above the dissolution temperature and below the decomposition temperature. Preferably, the stiffening is carried out in the edge parts of the film where the latter, for the subsequent stretching for the production of thin films, are gripped by clamps of a stretching device. The width of the stiffening segment along the film edges is here preferably 0.5 to 15 mm.

For decorative purposes, the stiffenings can be carried out in any desired design.

Heating can be carried out in such a way that, in a continuous process, the film is passed through one or more gaps formed by pairs of heated rolls, if appropriate under pressure, and the film can also be run in contact with heated metal plates for the stiffening treatment. Contactless heating by infrared irradiation is also possible.

In terms of time, temperature, process and equipment, the heating must be carried out in such a way that re-entangling of the polymer molecules occurs, in accordance with the equation given above. In this way, mechanical stiffening takes place in the heat-treated areas of the film, which can also still contain solvent. As a result of this stiffening, it is possible to stretch the film simultaneously or sequentially at ultra-high stretching ratios with the formation of thin films, without lips being formed thereby to an excessive extent, which lips can tear off at high stretching ratios, disturb the isotropy of the films and cause large quantities of waste.

The stiffened segments on the film can be formed in any desired configurations. In order to avoid the problems in stretching already mentioned, stiffened edge strips are generally formed on the film edges gripped by the clamps of the stretching device. The stiffenings can also be produced on the film edges in a controlled manner only in those areas at which the clamps of the stretching device engage. This can be effected, for example, in such a way that the edges of the film are brought into contact with rolls which, around their periphery in certain spacings which correspond to the engagement spacings of the clamps of the stretching devices, have heatable protrusions which stiffen the film pointwise on contacting.

The film can also be provided with stiffened segments in any other desired areas by the heat treatment described, for example in areas where a stretched sheet produced from these films is to be provided with eyelets or is to be fixed by screwing down and the like. Stiffened segments can also be produced in any desired arrangement for decorative purposes.

According to another embodiment of the invention, the stiffened segments in any desired configuration can also be produced in such a way that the films are provided on one side or both sides with a reinforcing layer, in particular of a polymer film, polyethylenes of low density (LLDPE) being particularly suitable reinforcing polymers. These films can usually be laminated on or fused on, if appropriate with the use of adhesion promoters.

The invention is illustrated in more detail by the attached drawings, (in plane view).

FIG. 1 shows the appearance of an edge part of a film which has been obtained by stretching, using a film of the generic type, claimed according to the invention, without stiffened segments on the edges.

Figure 2:
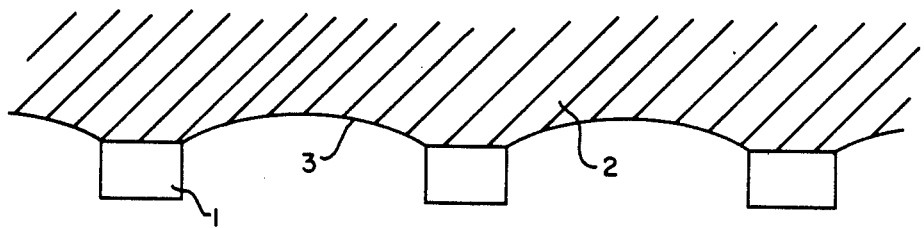
FIG. 2 shows the appearance of the adge part of the same type of film as in FIG. 1 which has been obtained by stretching a film with stiffened segments on the edge parts which are gripped by gripping such part with the clamps of the stretching device.

FIG. 2 shows the appearance of the edge part of the same film which has been obtained by stretching a film with stiffened segments on the edge parts gripped by the clamps of the stretching device.

As shown in FIG. 1, lips 2 are formed on the film, which has not been provided with stiffened segments on its stretching edges, as a result of stretching by the clamps 1, which lips become increasingly thinner in the tension area with increasing stretching ratio and can finally tear off. These lips form to a greater extent, the greater the distance between two clamps 1 engaging on the film 3.

α is the angle between the tangent, placed through the upper right corner of the pulling clamps at the inner flank of the lips, and a line parallel to the original film edge at the distance of the travel covered by the pulling clamps. A radius of curvature of the lips is produced by the stretching, assuming a semicircular form of the resulting lips.

The complete disclosures of U.S. Application of Rutten et al Ser. No. 07/223,660, U.S. Application of Van Unen et al. Ser. No. 07/223,973, and U.S. Application of Pluyter, Ser. No. 07/223,972, all filed on even date herewith, are incorporated herein by reference.

The following non-limiting examples explain the invention.

Example 1 (comparative example)

A polyethylene having a weight-average molecular weight of $1.5 \times 10^6$ g/mol (Hostalen GUR 412 ®) is dissolved in decalin in a concentration of 8% by weight, with the addition of 1% by weight of an antioxidant, relative to the polyethylene, in a twin-screw extruder (Berstorff ZE 40×33 D) of 25 mm internal diameter at a temperature of 185° C. during a residence time of 7 minutes.

The solution obtained is extruded through a shaping die to give a tape which is cooled by introducing it into water of a temperature of 15° C. A piece of 200×200 mm dimensions is cut out of this tape. This piece is clamped into an elastic frame and dried, a shrinkage of 15% in the machine direction and 31% in the transverse direction being allowed. Simultaneous biaxial stretching is then carried out in a biaxially operating stretching device in an oven at a temperature of 131° C. at a rate of 33%/second (=40 mm/second) until a stretching ratio of 8×8 is reached. Before stretching, the distance of the mutually opposite clamps is 70 mm.

Table I which follows summarizes the results of measurements of 4 lips produced by the stretching, L being the distance between the centre of adjacent pulling clamps in each case, α being the angle between the tangent, placed through the upper right corner of the pulling clamps at the inner flank of the lips, and a line parallel to the original film edge at the distance of the travel covered by the pulling clamps, and R being the radius of curvature of the lips produced by the stretching. The smaller the angle α and the larger the radius of curvature R (in mm), the smaller are the lips formed (compare FIG. 1).

TABLE I

|  | 1 | 2 | 3 | 4 |
|---|---|---|---|---|
| Clamp distance L (mm) | 81 | 80 | 80 | 81 |
| α | 70° | 43° | 62° | 78° |
| R (mm) | 35 | 42 | 33 | 30 |

Even though the film has been biaxially stretched at a stretching ratio of the clamps of 8×8, it shows in its middle part only a stretching ratio of about 6×6, because of the very pronounced lips formed. On further stretching, these lips tear in the vicinity of the clamps.

Example 2

The procedure described in Example 1 is repeated, the piece of film being heat-treated, after drying, at its 4 side edges for a length of 140 mm and a width of 4 mm during a period of 8 seconds by means of a hot metal piece under a load of 100 N at 150° C.

Simultaneous biaxial stretching at a rate of 33%/second (=40 mm/second) up to a stretching ratio of the clamps of 8×8 is carried out in an oven at a temperature of 131° C. During stretching, the film thickness decreases from originally 500 μm to 2.2 μm. In contrast to comparative Example 1, the stretching ratio of the film in its middle part is 7.5×7.5.

The results are summarized in Table II which follows.

TABLE II

|  | 1 | 2 | 3 | 4 |
|---|---|---|---|---|
| Clamp distance L (mm) | 80 | 78 | 79 | 79 |
| α | 20° | 24° | 23° | 18° |
| R (mm) | 70 | 65 | 61 | 73 |

On further stretching, the film breaks.

The film described above can, without stiffened edges, be stretched up to a stretching ratio of 62 in one direction before it tears, whereas the uniaxial stretching ratio, after the stiffened edges have been produced, decreases to 12 (before tearing), which demonstrates the unexpected reinforcing effect of the stiffening treatment.

Example 3

The procedure described in Example 2 is repeated, the film being stretched first in the machine direction and then in the transverse direction. During stretching, the film thickness decreases from 150 µm to 2.3 µm.

The results are shown in Table III which follows:

TABLE III

|  | 1 | 2 | 3 | 4 |
|---|---|---|---|---|
| Clamp distance L (mm) | 81 | 79 | 79 | 80 |
| α | 21° | 24° | 19° | 20° |
| R (mm) | 71 | 67 | 69 | 76 |

Example 4 (comparative example)

A polyethylene of a weight-average molecular weight of about 1.5 million g/mol (Hostalen GUR 412®) is dissolved in decalin, together with 1% by weight of an antioxidant, relative to the polyethylene, in a quantity of 20% by weight in a manner described in Example 1 and, from the solution, a film is produced likewise in the manner described in Example 1, which film is allowed to shrink during drying by 8% in the machine direction and by 24% in the transverse direction.

In an oven at a temperature of 131° C., stretching is carried out according to Example 1 at a stretching rate of 33%/second (=40 mm/second) up to a stretching ratio of 8×8.

The results are shown in Table IV which follows.

TABLE IV

|  | 1 | 2 | 3 | 4 |
|---|---|---|---|---|
| Clamp distance L (mm) | 79 | 80 | 80 | 81 |
| α | 40° | 43° | 36° | 41° |
| R (mm) | 42 | 41 | 38 | 49 |

On further stretching, the film breaks in two clamps, while one clamp is no longer able to hold the film and the latter slides off.

Example 5

The procedure described in Example 4 is repeated, the film sample being stiffened at the edges by the procedure described in Example 2. The sample is then simultaneously biaxially stretched in an oven at a temperature of 131° C. up to a stretching ratio of 8×8 at 33%/second (=40 mm/second). During stretching, the film thickness decreases from 190 µm to 2.7 µm.

The results are shown in Table V which follows.

TABLE V

|  | 1 | 2 | 3 | 4 |
|---|---|---|---|---|
| Clamp distance L (mm) | 78 | 78 | 79 | 80 |
| α | 22° | 19° | 21° | 21° |
| R (mm) | 74 | 71 | 69 | 68 |

On further stretching, the film tears in the middle part. A comparison of the stretching ratio in one direction of the film sample, which has not been provided with stiffening edges, with a film sample having stiffening edges according to Example 2 shows a decrease of the stretching ratio from 43 to 18, which again demonstrates the unexpected ones reinforcing effect of the stiffening treatment according to the invention.

Example 6 (comparative example)

Polypropylene of a weight-average molecular weight of about 1,000,000 g/mol is dissolved in decalin in a quantity of 4% by weight by the procedure described in Example 1 and is processed by the method described therein to give a film sample which, at an oven temperature of 159° C., is simultaneously biaxially stretched up to a stretching ratio of 7×7 at a rate of 33%/second, the film thickness decreasing from 82 µm to 1.3 µm. In this case, the distance of the mutually opposite clamps before stretching is 90 mm.

The results are shown in Table VI which follows.

TABLE VI

|  | 1 | 2 | 3 | 4 |
|---|---|---|---|---|
| Clamp distance L (mm) | 95 | 94 | 94 | 95 |
| α | 67° | 73° | 55° | 68° |
| R (mm) | 32 | 35 | 41 | 32 |

Example 7

The procedure followed is as described in Example 5, the stiffening treatment being carried out at 175° C. for a period of 6 seconds, stiffened side edges of 34 mm×140 mm dimensions being produced under a load of 100N.

The results are shown in Table VII which follows.

TABLE VII

|  | 1 | 2 | 3 | 4 |
|---|---|---|---|---|
| Clamp distance L (mm) | 80 | 79 | 80 | 81 |
| α | 35° | 31° | 29° | 33° |
| R (mm) | 60 | 64 | 63 | 54 |

A comparison of the uniaxial stretching ratios of a film sample free of stiffening edges with a film sample provided with stiffening edges (compare Example 2) shows that the stretching ratio decreases from 59 to 44 on stretching in one direction.

We claim:

1. A film comprising copolymers of high molecular weight, obtained by casting polymers, dissolved or swollen in solvents, wherein said film contains stiffened segments having a width of at least 0.5 mm, and said polymers have molecular weights greater than $1 \times 10^4$ g/mol.

2. The film according to claim 1, wherein said film consists of polyolefins having a molecular weight (weight average molecular weight) of more than 100,000 g/mol.

3. The film according to claim 1 wherein said film consists of polyethylenes having a molecular weight (weight average molecular weight) from 400,000 to 6,000,000 g/mol.

4. The film according to claim 1, wherein said film is pre-stretched in the longitudinal direction.

5. The film according to claim 1, wherein said film is pre-stretched in the transverse direction.

6. The film according to claim 1, wherein said film is pre-stretched in both the longitudinal and transverse directions.

7. A process for producing the film according to claim 1 comprising:

dissolving or swelling a polymer of high molecular weight in a solvent, shaping the polymer solution or the swollen polymer to obtain a film, cooling the thus obtained film to a temperature below the gelling temperature, partially or completely removing the solvent, and stiffening segments of said film by heating (i) wherein, in the case that the solvent has been partially removed, the resulting film in the segments that are to be stiffened, is heated to a temperature which is between 10° C. below the crystalline melting point and the decomposition temperature of the polymer, or (ii) wherein, in the case that solvent has been completely removed, the resulting film, in the segments that are to be stiffened, is heated to a temperature which is above the dissolution temperature and below the decomposition temperature.

8. Process according to claim 7, wherein said heating is conducted for a period of time which is sufficient to permit re-entangling of the polymer molecules to occur in accordance with the equation:

$$\frac{\text{degree of uniaxial stretching of the entangled form}}{\text{degree of uniaxial stretching of the disentangled form}} \leq 0.8.$$

9. A process for producing the film according to claim 1 comprising:

dissolving or swelling a polymer of high molecular weight in a solvent, shaping the polymer solution of the swollen polymer to obtain a film, cooling the thus obtained film to a temperature below the gelling temperature, partially or completely removing the solvent pre-stretching the film in the longitudinal, the transverse or in both the longitudinal and transverse directions, and stiffening segments of said film by heating (i) wherein, in the case that the solvent has been partially removed, the resulting film in the segments that are to be stiffened, is heated to a temperature which is between 10° C. below the crystalline melting point and the decomposition temperature of the polymer, or (ii) wherein, in the case that the solvent has been completely removed, the resulting film, in the segments that are to be stiffened, is heated to a temperature which is above the dissolution temperature and below the decomposition temperature.

10. Process according to claim 9, wherein said heating is conducted for a period of time which is sufficient to permit re-entangling of the polymer molecules to occur in accordance with the equation:

$$\frac{\text{degree of uniaxial stretching of the entangled form}}{\text{degree of uniaxial stretching of the disentangled form}} \leq 0.8.$$

11. A process for producing high molecular weight film comprising:

dissolving or swelling a polymer of high molecular weight in a solvent, shaping the polymer solution or the swollen polymer to obtain a film, cooling the thus obtained film to a temperature below the gelling temperature, partially or completely removing the solvent, and pre-stretching the film in the longitudinal direction, or in the transverse direction, or in both the longitudinal and transverse directions, and stiffening segments of said film by laminating the film in the segments to be stiffened with a polymer film on one side or on both sides.

12. A process for producing high molecular weight film comprising:

dissolving or swelling a polymer of high molecular weight in a solvent, shaping the polymer solution or the swollen polymer to obtain a film, cooling the thus obtained film to a temperature below the gelling temperature, partially or completely removing the solvent, and stiffening segments of said film by laminating the film in the segments to be stiffened with a polymer film on one side or on both sides.

13. Process according to claim 1 wherein said polymer film used for lamination consists of low density polyethylene.

14. Process according to claim 12 wherein said polymer film used for lamination consists of low density polyethylene.

* * * * *

UNITED STATES PATENT AND TRADEMARK OFFICE
CERTIFICATE OF CORRECTION

PATENT NO. : 4,966,803
DATED : October 30, 1990
INVENTOR(S) : Pluyter et al

It is certified that error appears in the above-identified patent and that said Letters Patent is hereby corrected as shown below:

Column 1, line 64, change "adge" to
--edge--.

Claim 13, column 10, line 40, change "1" to
--11--.

Signed and Sealed this

Fourteenth Day of July, 1992

*Attest:*

DOUGLAS B. COMER

*Attesting Officer*      *Acting Commissioner of Patents and Trademarks*